(12) United States Patent
Pugh-Jones et al.

(10) Patent No.: US 9,315,168 B2
(45) Date of Patent: Apr. 19, 2016

(54) VEHICLE ASSEMBLY

(71) Applicant: ASTON MARTIN LAGONDA LIMITED, Warwickshire (GB)

(72) Inventors: Yan Pugh-Jones, Warwickshire (GB); Andrew Syvret, Warwickshire (GB); Matthew Parkes, Warwickshire (GB)

(73) Assignee: ASTON MARTIN LAGONDA LIMITED, Gaydon (GB)

( * ) Notice: Subject to any disclaimer, the term of this patent is extended or adjusted under 35 U.S.C. 154(b) by 0 days.

(21) Appl. No.: 14/390,540

(22) PCT Filed: Apr. 5, 2013

(86) PCT No.: PCT/GB2013/050888
§ 371 (c)(1),
(2) Date: Oct. 3, 2014

(87) PCT Pub. No.: WO2013/150311
PCT Pub. Date: Oct. 10, 2013

(65) Prior Publication Data
US 2015/0091328 A1     Apr. 2, 2015

(30) Foreign Application Priority Data
Apr. 5, 2012   (GB) .................................. 1206260.0

(51) Int. Cl.
*B60R 19/52*   (2006.01)
*B60R 21/34*   (2011.01)

(52) U.S. Cl.
CPC ................. *B60R 19/52* (2013.01); *B60R 21/34* (2013.01); *B60R 2019/525* (2013.01); *B60R 2021/343* (2013.01)

(58) Field of Classification Search
CPC .. B60R 19/52; B60R 21/34; B60R 2019/525; B60R 2021/343
USPC ................. 296/187.09, 187.04, 193.09, 193.1
See application file for complete search history.

(56) References Cited

U.S. PATENT DOCUMENTS

| 5,403,048 A | * | 4/1995 | Ekladyous | .............. B60R 19/52 |
| | | | | 248/298.1 |
| 5,865,500 A | | 2/1999 | Sanada et al. | |
| 6,805,213 B2 | | 10/2004 | Seffernick et al. | |

(Continued)

FOREIGN PATENT DOCUMENTS

| DE | 4343680 C1 | 5/1995 |
| DE | 19530262 A1 | 2/1996 |
| DE | 20314107 U1 | 1/2004 |
| DE | 10341982 A1 | 4/2005 |
| EP | 0656838 B1 | 1/1995 |
| EP | 1088997 A1 | 4/2001 |
| GB | 2344085 A | 5/2000 |
| JP | 56-31846 A | 3/1981 |
| JP | H0415123 A | 1/1992 |
| JP | 2010000881 A | 1/2010 |
| JP | 2010000881 A * | 1/2010 ............. B60R 19/52 |
| WO | 03024747 A1 | 3/2003 |
| WO | 2011104853 A1 | 9/2011 |

OTHER PUBLICATIONS

GB1206260.0—GB Search Report dated Jul. 25, 2012, 2 pages.
WO2013/150311—International Search Report dated Nov. 11, 2013, 7 pages.

*Primary Examiner* — Jason S Morrow
*Assistant Examiner* — E Turner Hicks
(74) *Attorney, Agent, or Firm* — Dorsey & Whitney LLP

(57) ABSTRACT

A vehicle assembly, comprising a vehicle grille and one or more body structure components, such as fenders. The vehicle grille is displaceable relative to the body structure components, wherein in a first position of the grille, the grille provides support to at least a part of the one or more body structure components and wherein in a second position, said support is reduced. A vehicle grille and a vehicle bonnet are also disclosed.

24 Claims, 7 Drawing Sheets

(56) References Cited

U.S. PATENT DOCUMENTS

| | | |
|---|---|---|
| 6,805,389 B1 | 10/2004 | Schellenberg |
| 7,100,973 B2 * | 9/2006 | Aigner .................... B60R 19/52 296/193.1 |
| 7,152,915 B2 * | 12/2006 | Diehl ...................... B60R 19/52 180/68.6 |
| 7,287,789 B2 | 10/2007 | Woods et al. |
| 7,416,241 B2 * | 8/2008 | Wallman ................. B60R 21/38 180/69.2 |
| 7,464,984 B1 | 12/2008 | McDaniel |
| 7,537,253 B2 | 5/2009 | Rosen et al. |
| 7,631,928 B2 * | 12/2009 | Ackland .............. B62D 25/105 296/193.11 |
| 7,766,112 B2 | 8/2010 | Kapadia et al. |
| 8,002,072 B2 * | 8/2011 | Schmahl ................ B60K 11/04 180/274 |
| 2005/0006928 A1 * | 1/2005 | Diehl ...................... B60R 19/52 296/193.1 |
| 2005/0093341 A1 | 5/2005 | Aigner et al. |
| 2007/0236047 A1 | 10/2007 | Wallman et al. |
| 2009/0120704 A1 * | 5/2009 | Thomas ............... B62D 25/105 180/69.2 |
| 2012/0217761 A1 * | 8/2012 | Nakamura ........... B62D 25/105 292/97 |
| 2013/0181484 A1 * | 7/2013 | Grattan ................ B62D 25/105 296/193.11 |

\* cited by examiner

VEHICLE ASSEMBLY

This application is a national stage application under 35 U.S.C. §371 of International Application No. PCT/GB2013/050888, filed Apr. 5, 2013, entitled "VEHICLE ASSEMBLY" which claims priority to GB Patent Application No. 1206260.0, filed Apr. 5, 2012, both of which are hereby incorporated by reference herein in their entireties.

FIELD

The present invention relates to a vehicle assembly, such as for a motor car, and also a vehicle grille and vehicle bonnet and a vehicle comprising one or more such parts.

BACKGROUND

Production motor vehicles are required to pass various safety tests to ensure that they are sufficiently safe for use on public roads. In particular, it is desirable that the risk of injury to pedestrians is minimised in the event of a collision between a pedestrian and a motor vehicle, in particular a collision between a pedestrian and the front or leading end of a motor vehicle.

Frequently, motor vehicles are provided with a grille located at a front end of the vehicle. The grille is often located between the bumper and bonnet or hood of the vehicle. The vehicle grille can serve to provide an opening or aperture through which air may flow into the engine compartment of the vehicle in order to facilitate the provision of air to the air inlet of the engine or cooling air to the vehicle radiator. The grille may also serve to provide structural rigidity to the front end of the vehicle by being fixedly connected, for example with rivets or other fixing means, to the bumper and/or bonnet or hood of a vehicle. In view of the prominent position of the grille, often at the front end of a vehicle, the grille is also designed in view of aesthetic considerations. Therefore, the grille needs to look good. Often, the grille is highly distinctive and its style, shape and/or quality may become closely associated with the brand of motor vehicle, such as the Aston Martin (registered trade mark) grille whose shape is highly distinctive and whose typical quality metal construction exemplifies the very high quality and craftsmanship associated with the motor vehicle generally. Some motor cars have a grille of plastics which is difficult to make look particularly high quality. Some motor cars include compliant mouldings near the motor car front. This does not allow a single bonnet part, e.g. of metal, to extend fully to the front of the vehicle and requires the additional panel components.

SUMMARY

The present invention aims to alleviate, at least to a certain extent, the problems and/or address at least to a certain extent the difficulties associated with the prior art.

According to an aspect of the present invention, there is provided a vehicle assembly, comprising a vehicle grille and one or more body structure components such as fenders, the vehicle grille being displaceable relative to the body structure components, wherein in a first position of the grille, the grille provides support to at least a part of the one or more body structure components and wherein in a second position, said support is reduced.

Advantageously, therefore, the grille may be displaceable during a pedestrian impact so as to reduce its support for the body structure components and minimise pedestrian injury by allowing increased movement of body structure components during impact.

Preferably, the one or more body structures include or are fenders or side wings of a vehicle.

Preferably, the grille is provided at the front end of the vehicle. When the grille is displaced, the amount of support provided to the body structure components, such as fenders, is thereby reduced. In the second position, the support provided by the grille may be fully removed, such that the structural stiffness of the vehicle assembly at the front of the vehicle is reduced. Where the body structure components are fenders, the fenders may therefore be released for movement during impact of the vehicle assembly with a pedestrian.

Preferably, the second position of the grille is a position of the grille spaced away from the front end of the vehicle in a longitudinal direction thereof.

Preferably, in the first position of the grille, a bumper structure provides support to the grille and in the second position, said support is reduced. Preferably, the bumper structure is a bumper armature. Preferably, the bumper armature has a radiused edge over which, in use, the grille is displaced. In the first position of the grille, the grille may connect the bumper structure to fenders of the vehicle assembly in a supporting manner. The grille, when moved to the second position by an impact, may no longer supportingly connect the bumper structure to the fenders such that movement of the fenders and bumper structure relative to one another is more easily allowed than when the grille is in the first position.

When the grille is displaced, the amount of support provided to the bumpers is thereby reduced. In the second position, the support provided by the grille may be fully removed, such that the structural stiffness of the vehicle assembly at the front of the vehicle is further reduced. Preferably, in the second position of the grille, the vehicle assembly is more compliant, preferably at the front end of the vehicle.

Preferably, in the first position of the grille, the grille is coupled to the one or more fenders. This coupling may be made with a releasable coupling.

Preferably, in a first position of the grille, the grille is coupled to the bumper structure. This coupling may be made with a releasable coupling.

Preferably, in the second position of the grille, the grille is decoupled from the one or more fenders. In this way, the fenders are not restrained by the grille.

Preferably, in the second position of the grille, the grille is decoupled from the bumper structure. In this way, the grille is not restrained by the bumper structure.

Preferably, in the second position of the grille, the grille is fully disconnected from the one or more body structures, e.g. bumper structure and/or fenders to which it is connected or coupled in the first position.

Preferably, the assembly further comprises a bonnet, wherein in the first position of the grille, the grille provides support for the bonnet and wherein in the second position of the grille, reduced support is provided by the grille for the bonnet. The grille may include bump stops attached thereto to support the bonnet. Thus, in the first position, the grille may provide supporting connection between all of the bonnet, bumper structure and fenders but once the grille is moved to the second position the strength of this connection may be substantially reduced so that these components may move more easily relatively to one another in a compliant fashion so that pedestrian impact performance is appropriate.

Preferably, a clearance is provided to permit displacement of the grille in a direction away from the front of the vehicle.

A clearance of sufficient size may be provided to ensure that the grille does not contact any other parts of the vehicle assembly when it is displaced.

Preferably, the vehicle grille includes one or more coupling means for releasably coupling the grille to one or more vehicle body parts, the coupling means being configured, in use, to decouple the grille from the one or more body parts when the coupling means is subjected to a predetermined load. The load may be a load that is a result of a force being applied to the front side of the grille.

Preferably, the coupling means are configured to permit recoupling of the grille following decoupling of the grille. Thus, with a minor impact in which the grille has been pushed back to the second position thereof without significant deformation of other components which were supportingly connected to the grille or to one another by the grille in its first position, the grille may simply be pulled forward again so that the vehicle assembly adopts its original configuration.

Preferably, the coupling means and grille are configured to permit displacement or decoupling of the grille in a direction towards the rear of the vehicle.

Preferably, the one or more body parts includes the one or more fenders and/or the bumper structure. The coupling means may be provided at spaced intervals around the grille. The predetermined load to decouple the grille may vary between coupling means or be substantially equal. Preferably, two coupling means are provided on the, in use, upper surface of the grille. Preferably, four spaced coupling means are provided on, or adjacent the, in use, lower surface of the grille.

Preferably, the coupling means is configured, in use, to resist displacement of the grille in a direction substantially transverse to a longitudinal axis of the vehicle. In this way, displacement, other than in a direction substantially parallel to a longitudinal direction of the vehicle, is reduced or avoided.

Preferably, the coupling means includes guide means to guide displacement of the grille. In this way, the displacement of the grille is controlled.

Preferably, the coupling means includes biasing means to resist decoupling of the grille from the one or more vehicle body parts.

Preferably, the biasing means is formed as a spring clip. Preferably, the spring clip is formed from a wire, preferably with a circular cross-section. The wire preferably forms an open loop. Preferably, the wire is in part semi-circular. Preferably, the wire is formed with a gap between opposing sides of the loop. Preferably, the gap narrows in width away from the semi-circular part. Preferably, the wire is formed of a resilient material such as metal. The spring clip may serve to couple the grille to a body part. The body part may be provided with a spacing element which is held or gripped by the spring clip in the first position of the grille. The spacing element may be connected to the body part. When there is a load applied to the grille, the spacing element may be released from the grip of the spring clip. Preferably, when a predetermined load is applied between the grille and spacing element, the spacing element is configured to bias the biasing means as the grille is displaced relative to the body part. Preferably, the biasing means is attached to or coupled to the body part. The spring clip may generally be capital Omega-shaped or jellyfish-shaped.

Preferably, the predetermined load is greater than 350 Newtons. More preferably, the predetermined load is greater than or equal to 385 Newtons. This load may be a load sufficient to bias the spring clip. The spring clip may be arranged to over-centre as the predetermined load is reached, such that the spring clip releases at the predetermined load and no longer provides force biasing the grille towards the first position thereof.

Preferably, the grille comprises one or more deformable vanes. In this way, the grille can absorb some impact before the coupling means decouples the grille from the respective body part. Preferably, the grille vanes are substantially planar. Preferably, the grille vanes are slotted into the grille at their rear. Preferably, the vanes are configured to permit localised deformation upon loading. This advantageously provides compliance during pedestrian impact, especially when the grille is formed at least partly of metal in which forward-facing vane components thereof are high quality metal such as aluminium alloy. Preferably, the grille is formed as a moulded substrate. Preferably, the grille vanes are slotted into recesses formed in the moulded grille substrate. Preferably, the grille vanes are retained using threaded fixings.

Preferably, the grille includes one or more bonnet bump stops. In this way, when the grille is displaced, the support for the bonnet is reduced or removed.

According to a further aspect of the present invention, there is provided a vehicle bonnet including an area of localised weakness. Such a bonnet may be used in the vehicle assembly of the first aspect. Advantageously, the area of localised weakness may allow relatively compliant deformation of the vehicle bonnet during pedestrian impact.

Preferably, the area of localised weakness is an area along the front edge of the bonnet. This may advantageously allow local deformation of a front portion of the bonnet. Preferably, the area of weakness includes a plurality of apertures. The apertures may be cut outs in a single skin of the bonnet structure.

Preferably, the apertures are formed as a plurality of spaced, preferably similarly sized slots. The apertures may be formed in a row. In this case, the apertures may advantageously allow a predictable folding of the bonnet in the region of the row during pedestrian impact.

According to a further aspect of the invention, there is provided a vehicle grille for a vehicle assembly according to the first aspect. The vehicle grille may include any one or more features of the grille as defined in the first aspect of the invention. The grille is preferably formed at least partly of metal.

According to a further aspect of the invention, there is provided a vehicle comprising a vehicle assembly according to the first aspect of the invention and/or a grille and/or a bonnet according to the further aspects of the invention.

BRIEF DESCRIPTION OF THE DRAWINGS

The present invention may be carried out in various ways and embodiments of the invention will now be described by way of example with reference to the accompanying drawings in which.

DETAILED DESCRIPTION

Figure 1A:
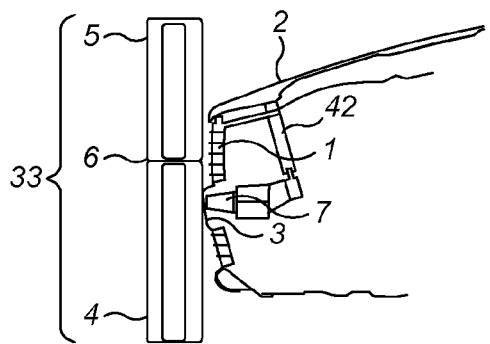
FIGS. 1A to 1F show cross sections though a longitudinal plane of the vehicle, at the front end of a vehicle, during sequential stages of a simulation of a front impact of the vehicle with a pedestrian lower leg model.

FIG. 1A shows the front end of a vehicle at the point of impact of a bumper skin 3 with a pedestrian lower leg model. The pedestrian lower leg model or lower leg impactor 33 comprises a lower part 4 representing the tibia region of a leg and an upper part 5 representing a femur region of a leg. The lower leg form impactor is designed to represent the lower leg form of a pedestrian and is a standard model from EC Regulation 436-2009.

The lower part 4 of the lower leg form impactor 33 has a length of 494 mm and the upper part 5 has a length of 432 mm. The upper and lower parts 4, 5 of the lower leg form impactor 33 are connected via a joint 6, which represents a deformable knee. The lower part 4 and the upper part 5 of the lower leg impactor 33 are formed as steel cylinders covered with a foam flesh and a synthetic skin. The outer diameter of the upper and lower parts 4, 5 is 132 mm.

As shown in FIG. 1A, the front of the vehicle includes a bumper structure, section or armature 3, a grille 1 and a bonnet 2. The bonnet 2 slopes downwards towards and terminates at the front end of the vehicle at an angle to a horizontal plane. Behind the front surface of the bumper armature 3, resiliently compressible foam 7 is provided. The grille 1 is orientated substantially vertically. Latch strikers, which serve to lock the bonnet, are located rearwards behind the grille 1 to avoid impact with the grille as it is displaced along the longitudinal axis of the vehicle away from the front of the vehicle. In the embodiment shown, the primary latch striker 42 is shown connecting the bonnet 2 to the bumper armature 3. Two secondary latch strikers (not shown) connect between the bonnet and the air on structure.

Figure 1B:
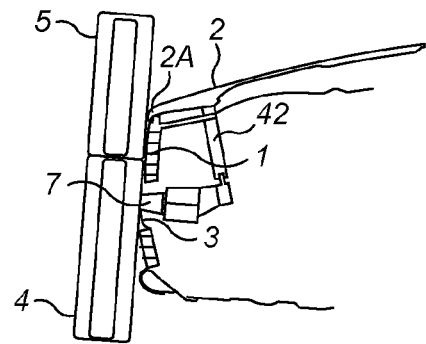

As shown in FIG. 1B, as the bumper impacts with the lower leg form impactor 33, the bumper armature 3 is deformed and the front edge of the bumper armature, i.e. the edge in contact with the lower part 4 of the leg form impactor 33, rearwardly displaces longitudinally of the vehicle.

Figure 1C:
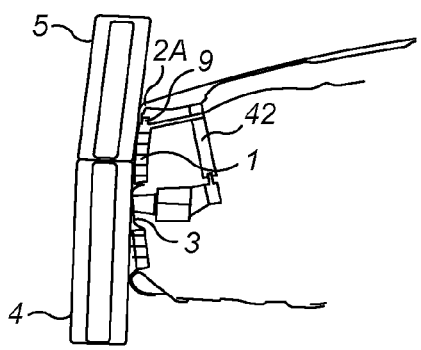

As shown in FIG. 1C, as the vehicle impacts further with the lower leg form impactor 33, the upper part 5 of the impactor 33 comes into contact with the grille 1. The leading edge 2A of the bonnet 2 deforms or bends as the load increases from its impact with the lower leg form impactor 33. As described later, the bonnet includes an area of weakness along its leading edge which allows this bending or rolling action of a front end portion of the bonnet. During the stages of impact, a bump stop 9, which normally provides support to the bonnet 2, becomes increasingly clear or spaced from the bonnet or hood 2.

Figure 1D:
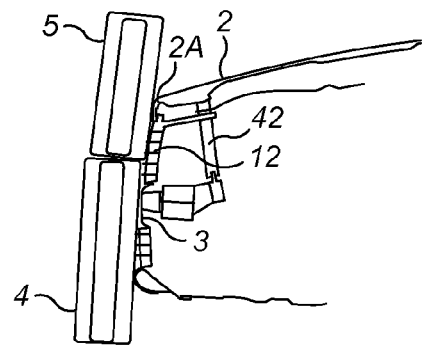

As shown in FIG. 1D, as the lower leg form impactor 33 impacts with the front end of the vehicle, there is increasing deformation of the leading edge 2A of the bonnet 2. In addition, the grille 1 is displaced rearwards in the vehicle in a direction substantially parallel with the longitudinal axis of the vehicle. A clearance is provided in the engine compartment to facilitate displacement of the grille. As described later, the grille includes coupling means which decouple from the bumper and fenders when the coupling means are subjected to a predetermined load.

Figure 1E:
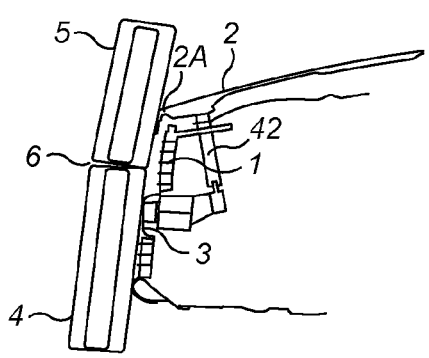

As shown in FIG. 1E, as the grille 1 is displaced, the grille no longer provides support to the bonnet 2 and the leading edge 2A of the bonnet increasingly deforms as force is exerted by the lower leg form impactor 33. Therefore, even though the leading edge 2A of the bonnet, which may be metal, is located right at the front of the vehicle, there is compliance enabling the good pedestrian impact performance. A separate compliant moulding in front of the leading edge 2A is not required. Furthermore, as the grille 1 has been displaced from the front end of the vehicle, continued contact between the lower leg form impactor 33 and the grille 1 is reduced or avoided.

Figure 1F:
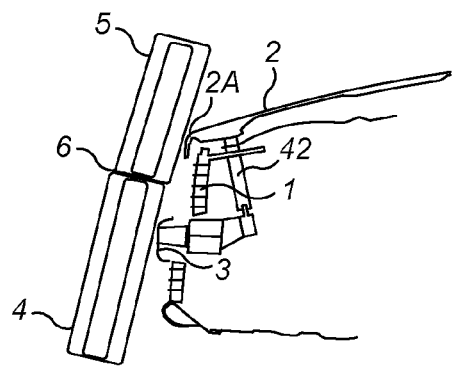

As can be seen in FIGS. 1A to 1F, the lower part 4 and upper part 5 of the lower leg impactor 33 tend to orientate at an increasing angle to the vertical. As shown in FIG. 1F, as the lower leg impactor 33 gradually falls over the top of the bonnet, there is reduced contact with the bumper 3. The bumper structure has a degree of resilience and when it is no longer subjected to loading, returns to its former shape. The knee joint 6 hinges through elastic deformation.

Figure 2:
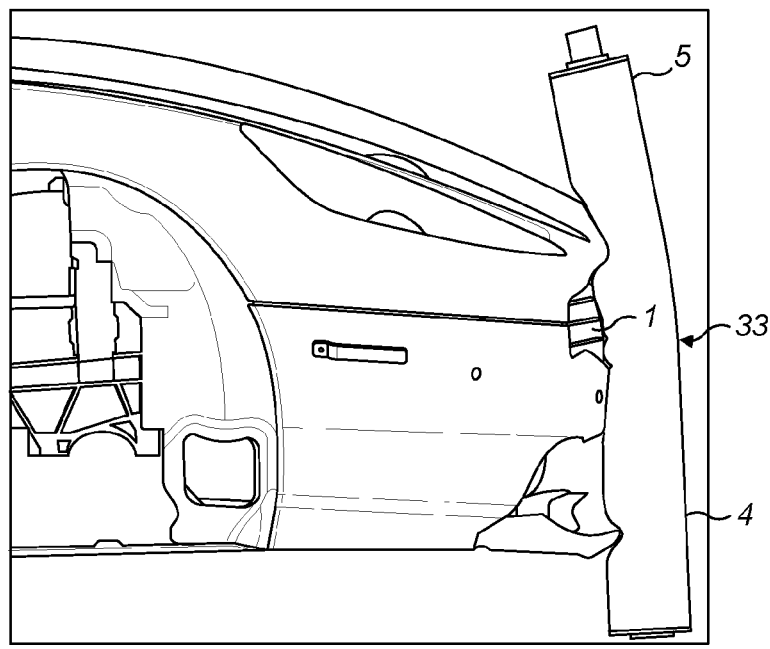
FIG. 2 shows a side view of the impact of a front of a vehicle with a pedestrian lower leg model.

FIG. 2 shows a side view of the front end of the vehicle in contact with the lower leg impactor 33.

Figure 3A:
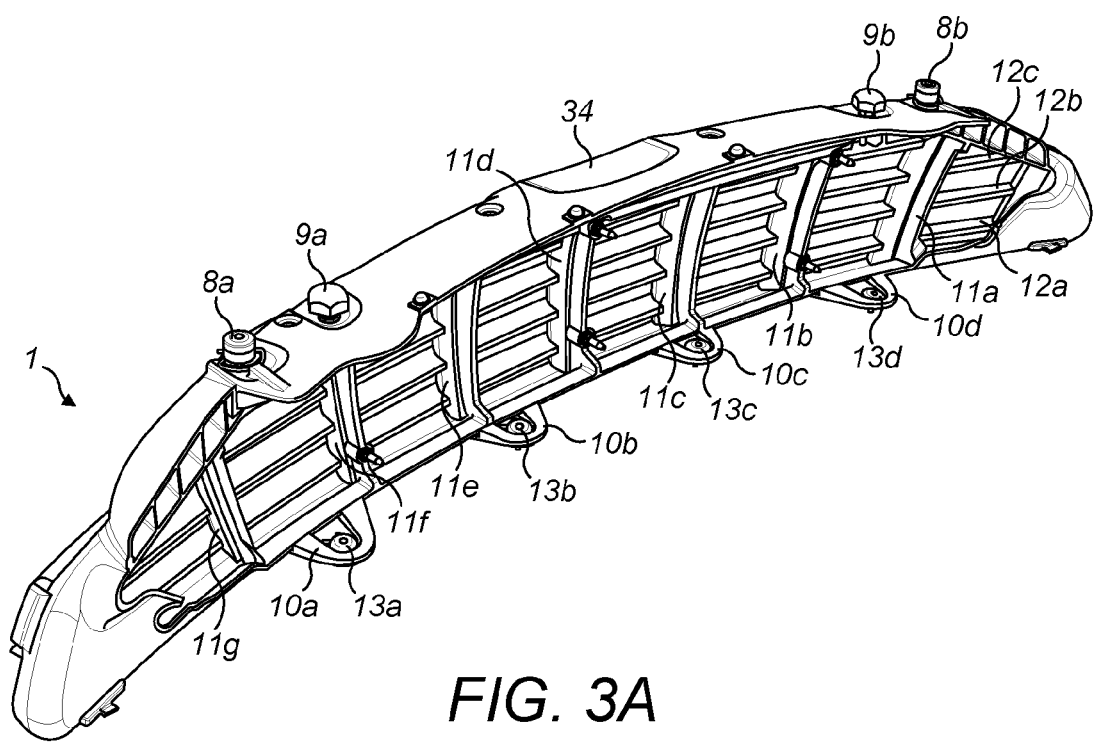
FIG. 3A shows a rear perspective view of a grille according to an aspect of the present invention.

FIG. 3A shows a perspective rear view of the grille 1. The grille 1 is formed with a generally oval peripheral wall moulding or body 34. The grille 1 comprises a plurality of vertical or generally vertical supporting ribs 11a to 11g. The wall moulding or body 34 and the ribs 11a to 11g may be formed together as a single moulded grille substrate. The grille 1 is also provided with a plurality of parallel grille vanes 12a to 12e (see also FIG. 3B) which are located spaced from one another between the top upper surface of the grille 1 and the lower bottom surface of the grille 1.

The grille vanes 12a to 12e are metal and connected to the vertical supporting ribs 11a to 11g which may be of metal or plastics. The grille vanes 12a to 12e are slotted into the supporting ribs 11a to 11g. Through this arrangement, the grilles vanes 12a to 12e are configured to deform or displace locally on impact to provide good compliance during pedestrian impact and reduce localised inertia effect. Thus, even though the vanes 12a to 12e may be of metal alloy providing an appearance of high solidity and quality, they may in fact be relatively compliant. The grille vanes 12a to 12e and the supporting ribs 11a to 11g extend in substantially or generally orthogonal directions to one another to produce a lattice-like structure. The grille vanes 12a to 12e and the supporting ribs 11a to 11g provide through holes or apertures therebetween. The supporting ribs 11a to 11g may comprise rear moulded portions moulded with the body 34 and front vane portions of metal which are pushed/fastened onto the rear moulded portions and are locally compliantly deformable relative to the body during pedestrian impact.

Figure 8A:
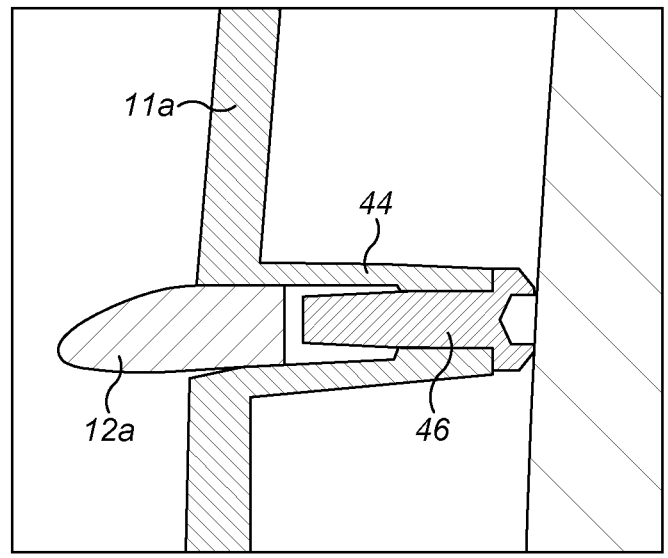
FIG. 8A shows a cross section in a vertical plane through a grille vane and grille substrate.
Figure 8B:
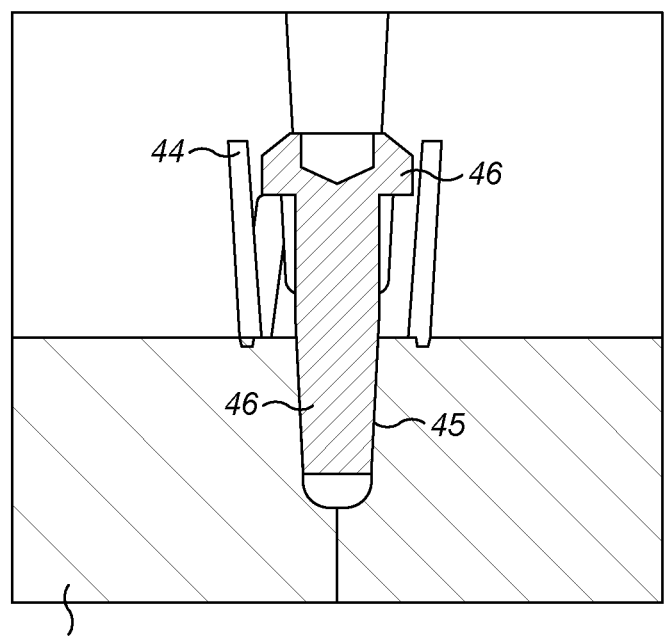
FIG. 8B shows a cross-section in a horizontal plane through the grille vane as shown in FIG. 8A.

FIG. 8A is a cross-section in a vertical plane, showing a grille vane 12a slotted in a recess formed in a moulded extension 44 in the vertical supporting rib 11a of the moulded grille substrate. The extension 44 extends rearward the grille substrate in a generally horizontal plane and is formed with a recess to receive the grille vane 12a in substantially horizontal orientation. A threaded bore 45 (see FIG. 8B) is provided in the rear side of the grille vane 12a. A threaded fixing 46, such as a bolt or screw, is screwed from the rear side of the recess of the grille moulding into the rear side of the grille vane 12a to maintain the grille vane 12a in position. FIG. 8B is a cross-section in a horizontal plane, showing the threaded fixing 46 engaged with the grille vane 12a.

On the top upper side of the grille 1, a bonnet bump stop 9a, 9b is provided proximate either lateral side. When assembled in a vehicle, the bonnet bump stops 9a, 9b provide a support for a vehicle bonnet when the bonnet is in a closed position.

Figure 3B:
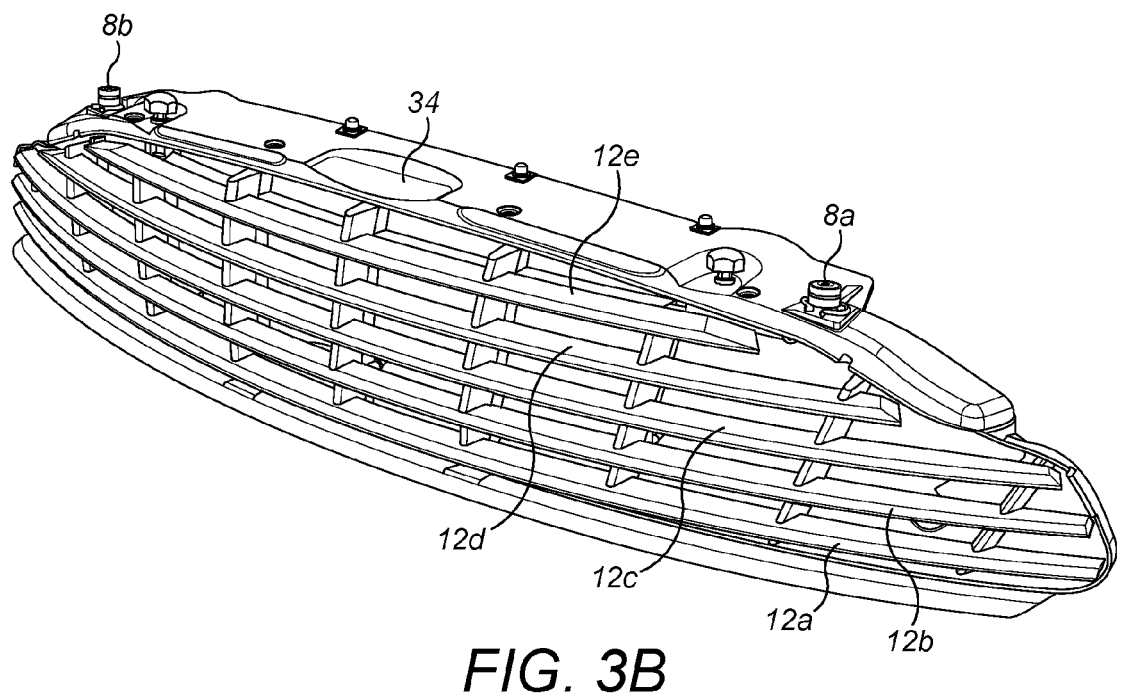
FIG. 3B shows a front perspective view of the grille of FIG. 3A.

As shown in FIGS. 3A and 3B, the top upper surface of the grille 1 is also provided with a pair of coupling means 8a, 8b. The coupling means 8a, 8b are provided spaced from one another at opposing sides of the top upper surface of the grille 1.

At the lower bottom surface of the grille 1, a plurality of fixing apertures 10a to 10d are provided. These fixing apertures 10a to 10d are formed as loop shaped forms which extend in a plane substantially parallel to the lower bottom surface of the grille 1. In the embodiment, the fixing apertures are formed integrally with the grille periphery moulding 34.

FIG. 3B shows a front perspective view of the front of the grille 1. In this view, the coupling means, 8a, 8b can be seen located on the top upper surface of the grille 1. The grille vanes 12a to 12e, which in the embodiment shown are formed as strips of aluminium alloy, extend from each side of the grille 1 and are orientated in substantially horizontal planes.

Figure 4A:
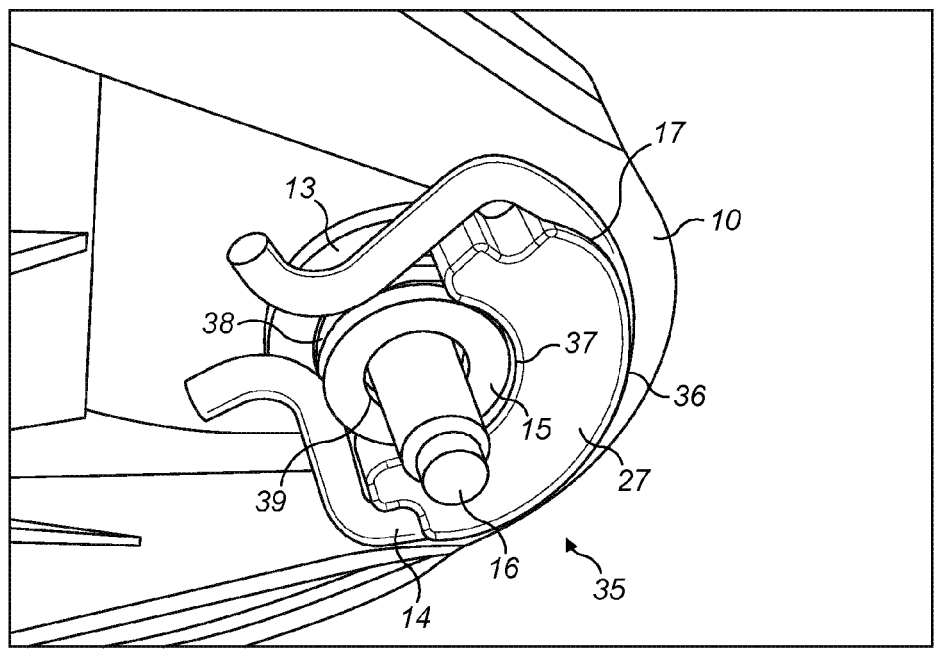
FIG. 4A shows an underside perspective view of a lower coupling means attached to the grille of FIG. 3A.

FIG. 4A shows the lower or second coupling means 35 located towards the lower bottom edge or surface of the grille 1. In use, the second coupling means 35 are used to connect or couple the grille 1 to a bumper member, e.g. a bumper armature (not shown).

As shown in FIG. 4A, the fixing aperture 10 of the grille 1, includes a detent or locating point in the form of an extension or protrusion 27 which extends below the plane of the fixing aperture 10. The protrusion 27 is formed with an outer radial wall 36 and an inner radial wall 37, which share a common axis of rotation. On the outer radial wall 36 of the protrusion, a recessed groove 17 is provided. The recessed groove 17 has a substantially semi-circular cross section.

The outer radial wall 36 and the inner radial wall 37 do not extend fully to form a closed shape. Instead the inner radial wall 37 of the protrusion 27 is formed to receive a cylindrical spacing element 15. The cylindrical spacing element 15 is provided with a recessed groove 38 around its circumference which has a substantially semi circular cross-section.

Figure 4B:
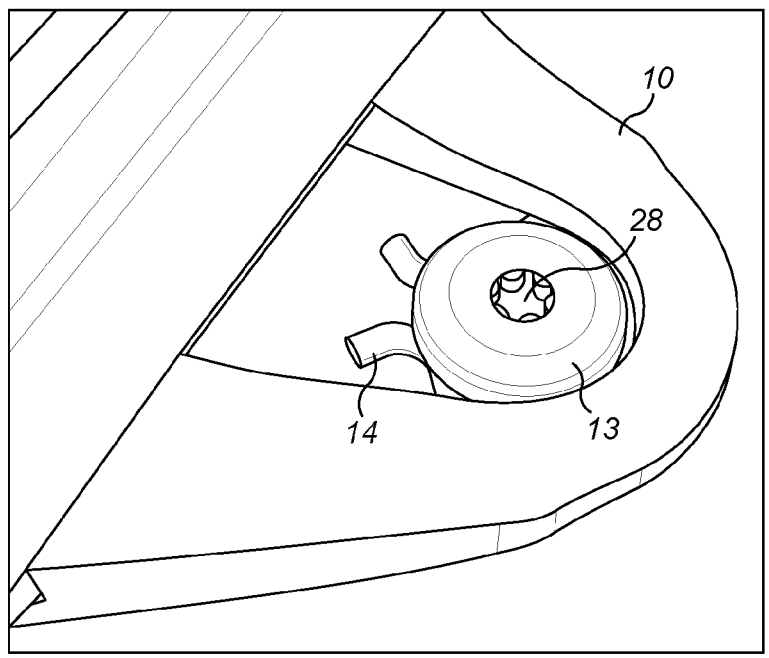
FIG. 4B shows a top perspective view of a lower coupling means attached to the grille of FIG. 3A.

A through hole 39 is provided in the cylindrical spacer 15 extending through the centre thereof through which a bolt 16 may be positioned. The bolt has a head or end cap 13 which has a diameter larger than the diameter of the cylindrical spacer 15. As such, the cylindrical spacer 15 is retained in position by the bolt 16. The bolt 16 also includes a tool connector 28 (as shown in FIG. 4B), for example a recess, to receive an Allen key or other such tool to facilitate assembly. A bumper, not shown, is provided with means to receive the bolt such that the bolt 16 can be screwed into or connected with the bumper to retain the cylindrical spacer 15 with the bumper.

As shown in FIG. 4A, a spring clip 14 is provided which is shaped like a capital Omega or jellyfish cross section to extend around the outer radial surface 36 of the protrusion 27, and to engage at least partially in the recessed groove 17 formed in the outer radial surface 36. The spring clip 14 is formed from a wire with a circular cross-section. The wire forms an open loop which in part is semi-circular, with a gap between opposing sides of the loop, the gap first narrowing in width in a direction away from the semi-circular part followed by a section where the width of the gap increases. The maximum width of the gap is formed to be smaller that the diameter of the cylindrical spacer 15. The wire is formed of a resilient material such as metal.

As can be seen in FIG. 4A, the spring clip 14 is formed in a single plane. When the second coupling means 35 is assembled, the opposing sides of the spring clip 14 bias against the recessed groove 38 of the cylindrical spacer 15. This arrangement resists removal of the cylindrical spacer 15 from its engagement with the inner radial surface 37 of the protrusion 27.

As the spring clip 14 also engages in the recessed groove 17 in the outer radial surface 36 of the protrusion 27, the spring clip serves to resists removal of the grille 1 from the bumper (not shown) in a direction substantially parallel to the longitudinal axis of the bolt 16.

Four identical coupling means 35 are provided at spaced intervals along the lower most edge of the grille 1. The spring clips 14 are chosen such that, in the embodiment, a load of 1540 Newtons applied in the region of the lower side of the grille 1 is required in order for the cylindrical spacers 15 to bias open the respective spring clips 14 such that the cylindrical spacers 15 may pass through the gap in the respective spring clips 14. This load, termed a break out load, corresponds to an average load of 385 Newtons per coupling means.

It can therefore be understood that during an impact of the grill with a body such as a lower leg of a pedestrian, when a load of around 1540 Newtons or more is applied to the lower part of the grille 1, the lower part of the grille 1 is released or decoupled from the bumper.

Figure 5A:
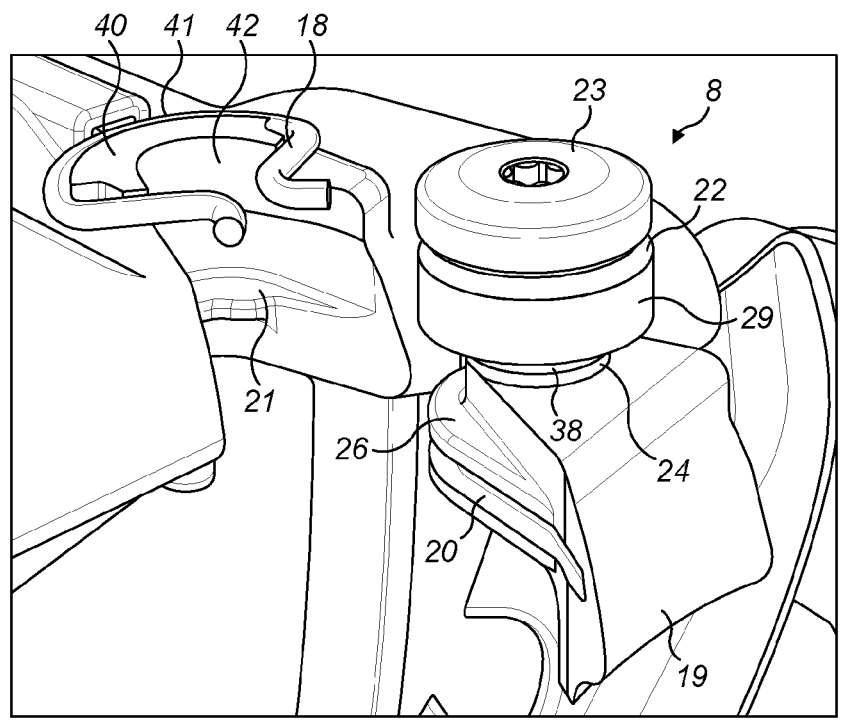
FIG. 5A shows an upper coupling means of the grille of FIG. 3A shown in a second decoupled position with the grille.

FIG. 5A shows a view of the upper or first coupling means 8 on the upper surface of the grille 1. The coupling means 8 comprises a moulding 19 which fits in a correspondingly formed part of the upper surface of the grille 1. The moulding 19 is formed with a protrusion 26 which has a guide groove 20, which lies in a substantially horizontal plane. Into this guide groove, a protrusion 21 may be received. This protrusion 21 is formed in the correspondingly formed part of the grille 1. When the moulding 19 and the correspondingly formed part of the grille 1 are in engagement, the guide groove 20 is located within the protrusion 21 and vertical displacement of the moulding 19 relative to the grille 1 is resisted. The correspondingly formed part of the upper surface of the grille is only open at the front edge of the grille 1. As such, when the moulding 19 is engaged, transverse displacement of the moulding 19 relative to the grille 1 is resisted. These parts thereby serve as guide means to guide the direction of displacement and decoupling of the grille from the fenders.

The coupling means 8 includes a bolt 23 which extends through a washer or supporting part 29 and a cylindrical spacer 24. The cylindrical spacer 24 is similar in form to the cylindrical spacer 15 described in relation to the second coupling means and is similarly provided with a grooved recess 38 around its circumference. A spring clip 18 is provided which is formed similarly to the spring clip on the second coupling means. The upper surface of the grille 1 is formed with a detent in the form of a protrusion 40, similar in form to the protrusion on the lower fixing apertures. The spring clip 18 similarly is located in a recessed groove 41 formed in the outer radial surface of the protrusion 40.

Figure 5B:
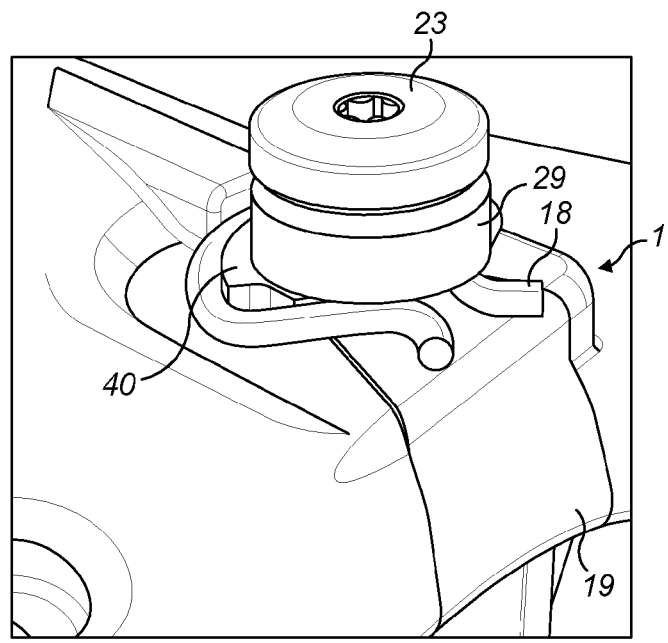
FIG. 5B shows the upper coupling means of FIG. 5A shown in a first coupled position with the grille.

FIG. 5B shows the moulding 19 engaged with the grille 1. In this position, the spring clip 18 retains or holds the cylindrical spacer 24 against an inner radial surface 42 of the protrusion 41.

Figure 5C:
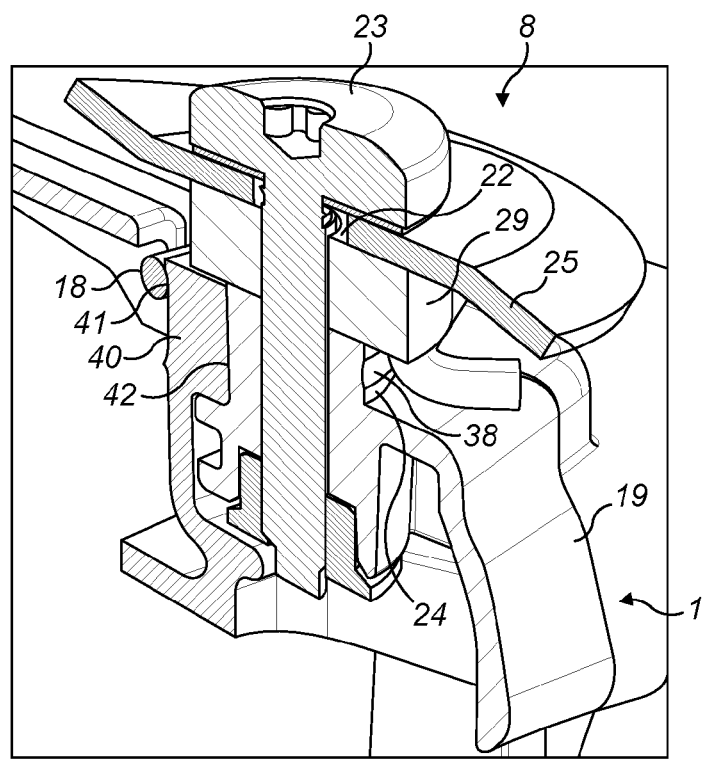
FIG. 5C shows a cross section through the upper coupling means of FIG. 5A in a first coupled position with the grille.

FIG. 5C shows a cross section through the coupling means 8 and the upper surface of the grille 1. In this view, the coupling means 8 is shown connected to a fender or wing 25 of a vehicle. The fender is connected via the bolt 23 which passes through a hole in the fender. The fender is retained and connected to the moulding 19 in the gap 22 between the lower surface of the bolt head and the washer or support member 29.

When the cylindrical spacer 24 is located within the spring clip 18, the spring clip resists removal of the cylindrical spacer 24. As the cylindrical spacer is connected to a fender via the bolt 23, displacement of the grille 1 relative to the fender is resisted.

Two generally identical second coupling means 8 are provided at either side of the top upper surface of the grille 1. In the embodiment, the spring clips 18 are chosen such that a load of 770 Newtons applied in the region of the upper side of the grille 1 is required in order for the cylindrical spacer 24 to bias open the spring clip 18 such that the cylindrical spacer 24 may pass through the gap in the spring clip 18. This load, termed a break out load, corresponds to an average load of 385 Newtons per coupling means.

It can therefore be understood that during an impact of the grille with a body such as a lower leg of a pedestrian, when a load of around 770 Newtons or more is applied to the upper part of the grille 1, the upper part of the grille 1 is released or decoupled with the fenders to which it is coupled.

In a vehicle assembly, comprising a grille 1, the first and second coupling means 8, 35 serve to connect or couple the grille 1 with the vehicle body parts, here the fenders or wings 25 of a vehicle and also to the bumper armature 3 of the vehicle, when the grille is in a first position. The grille 1 therefore serves to support and to maintain the fenders, and bumper of the vehicle in position. In the case of an impact as described previously with reference to FIGS. 1A to 1F, when a predetermined load is exceeded, the first and second coupling means 8, 35 decouple the grille 1 from the bumper armature 3 and the wings or fenders 25. In this case, the fenders 25 are no longer held in a fixed transverse position and the stiffness of the front end of the vehicle reduces. Because the first and second coupling means 8, 35 are only decoupled when a predetermined load has been reached, during low impacts, the grille 1 remains in position.

Assuming no damage is caused to the coupling means, once the grille is decoupled from the fenders and bumper, the grille can be subsequently replaced or reset in its original position and retained by the spring clips 14, 18.

When the grille 1 becomes decoupled from the bumper 3 and the wings or fenders 25 of the vehicle and is displaced into a second position, the fenders and bumpers are no longer constrained and so in case of a pedestrian impact, the strength of the overall system or structure at the front of the vehicle is reduced, providing a more resilient assembly. As such, any impact is then only against the stiffness or strength of individual parts of the vehicle body. The rearward movement of the grille also reduces support for the leading edge 2A of the bonnet 2.

Figure 6:
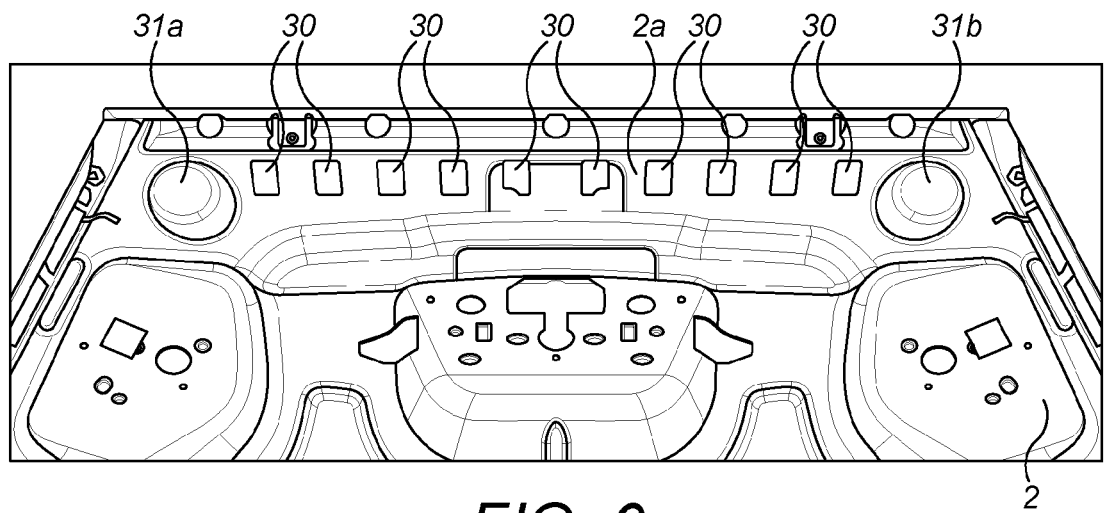
FIG. 6 shows an underside view of a vehicle bonnet or hood according to a further aspect of the invention.

As shown in FIG. 6, the leading edge 2a of the vehicle bonnet 2 is provided with a series of slots 30. The slots 30 are formed as a plurality of spaced rectangular apertures formed in a lowermost, in use, skin of the bonnet of the vehicle 2. These apertures 30 in the skin of the bonnet, permit localised deformation or bending of the bonnet during impact. This localised deformation has been described in relation to FIGS. 1A to 1F. These apertures reduce the stiffness of the leading edge 2a of the bonnet relative to the other areas of the bonnet 2 and their formation in a row enables a predictable bending with a rolling action during pedestrian impact.

The bonnet 2 of the vehicle is also provided with recesses 31a and 31b in which the bonnet bump stops 9a, 9b may be received.

Figure 7:
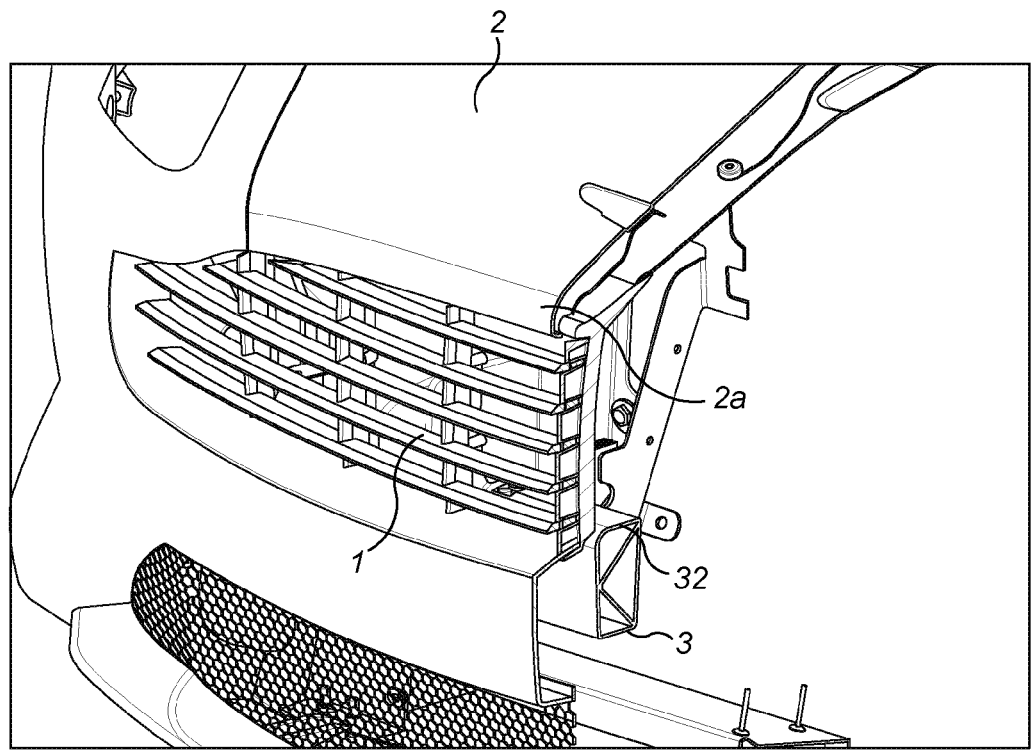
FIG. 7 shows a section through a perspective view of the front of a vehicle comprising a grille, a bonnet, bumper armature and wing or fender.

Because the grille 1 becomes decoupled from the fender 25 and bumper 3 during impact, the grille is free to move longitudinally in the vehicle. As shown in FIG. 7 and also in FIGS. 1A to 1F, a space or cavity is provided behind the vehicle grille in order to facilitate the displacement of the grille in a longitudinal direction. When decoupled, the grille is free to move in a longitudinal direction away from the front end of the vehicle. In the embodiment, the grille 1 and coupling means are the only location points for the fender and bonnet at the leading or front end of the vehicle. The decoupling of the grille 1 from the fenders 25 and bumper 3 and its movement rearward so that it no longer so strongly supports the bonnet 2 produces a front end of the vehicle which is more compliant than when the grille 1 is coupled with the fenders 25 and the bumper 3. As shown in FIG. 7, the top edge 32 of the bumper armature 3 is radiused to facilitate the riding over of the grille 1 when it is decoupled.

The inventively moveable grille 1 serves like an architectural keystone in that in one position it provides high rigidity of components so that they are well held against vibration and aerodynamic loads during motoring but when moved to another position the components become significantly more compliant, thereby providing good pedestrian impact performance. During a minor impact, the grille 1 may be moved backwards from its first, original position but other components may not be permanently deformed. The grille 1 may then be pulled forward to its original position and the spring clips 14, 18 may over-centre and snap back to their original configurations.

In accordance with the above embodiment and discussion, a motor vehicle such as a motor car may therefore provide excellent pedestrian impact performance while also enabling the use of components of the very highest quality, such as a high quality and solid-looking metal-vaned grille plus a bonnet formed in the highest quality materials such as metal which extends uninterrupted fully to the front end of the vehicle without the need for a compliant moulding between the bonnet front end and the grille. Even though one might think metal components like a grille, bonnet and fenders would be difficult to make compliantly deformable during pedestrian impact, especially when these components are required to remain very rigid under normal driving conditions, preferred constructions in accordance with the invention are advantageously able to achieve excellent pedestrian impact results while still providing the possibility of constructions at the very highest levels of style and craftsmanship.

The present invention may be carried out in various ways and various modifications are envisaged to the embodiments described without extending outside the scope of the invention as defined in the accompanying claims.

The invention claimed is:

1. A vehicle assembly, comprising a vehicle grille and fenders, the vehicle grille being displaceable relative to the fenders, wherein in a first position of the grille, the grille provides support to at least a part of the fenders and in a second position, said support is reduced; and wherein the vehicle grille includes one or more couplers releasably coupling the grille to the fenders, wherein when the one or more couplers are subjected to a predetermined load, the one or more couplers decouple the grille from the fenders, releasing the fenders for movement.

2. A vehicle assembly according to claim 1, wherein in the first position of the grille, a bumper structure provides support to the grille and in the second position, said support is reduced.

3. A vehicle assembly according to claim 1, wherein in the first position of the grille, the grille is coupled to the fenders.

4. A vehicle assembly according to claim 2, wherein in the first position of the grille, the grille is coupled to the bumper structure.

5. A vehicle assembly according to claim 1, wherein in the second position of the grille, the grille is decoupled from the fenders.

6. A vehicle assembly according to claim 2, wherein in the second position of the grille, the grille is decoupled from the bumper structure.

7. A vehicle assembly according to claim 1, further comprising a bonnet, wherein in the first position of the grille, the grille provides support for the bonnet and wherein in the second position of the grille, reduced support is provided by the grille for the bonnet.

8. A vehicle assembly according to claim 1, wherein a clearance is provided to permit displacement of the grille in a direction away from the front of the vehicle.

9. A vehicle assembly according to claim 2, wherein the vehicle grille further includes one or more couplers that releasably couple the grille to the bumper structure, wherein, when the one or more couplers are subjected to a predetermined load, the one or more couplers, decouple the grille from the bumper structure.

10. A vehicle assembly according to claim 9, wherein the one or more couplers resist displacement of the grille in a direction substantially transverse to a longitudinal axis of the vehicle.

11. A vehicle assembly according to claim 9, wherein the one or more couplers include a guide that guides displacement of the grille.

12. A vehicle assembly according to claim 9, wherein the one or more couplers include a biasing component that resists decoupling of the grille from the fenders.

13. A vehicle assembly according to claim 12, wherein the biasing component is a spring clip.

14. A vehicle assembly according to claim 9, wherein the predetermined load is greater than 350 Newtons.

15. A vehicle assembly according to claim 14, wherein the predetermined load is greater than or equal to 385 Newtons.

16. A vehicle assembly according to claim 1, wherein the grille comprises one or more deformable vanes.

17. A vehicle assembly according to claim 1, wherein the grille includes one or more bonnet bump stops.

18. A vehicle assembly according to claim 1, further comprising a vehicle bonnet including an area of localised weakness.

19. A vehicle bonnet according to claim 18, wherein the area of localised weakness is an area along the front edge of the bonnet.

20. A vehicle bonnet according to claim 18, wherein the area of localised weakness includes a plurality of apertures.

21. A vehicle bonnet according to claim 20, wherein the apertures are formed as a plurality of spaced slots.

22. A vehicle grille for a vehicle assembly as claimed in claim 1.

23. A vehicle assembly according to claim 1, wherein the grille includes a series of metal vanes, at least one of the vanes being arranged for locally compliant deformational movement relative to a body of the grille.

24. A vehicle including a vehicle assembly as claimed in claim 1, a vehicle assembly as claimed in claim 18, or a vehicle grille as claimed in claim 22.

* * * * *